United States Patent
Kim et al.

(10) Patent No.: US 10,008,720 B2
(45) Date of Patent: Jun. 26, 2018

(54) METHOD OF PREPARING POSITIVE ELECTRODE ACTIVE MATERIAL FOR LITHIUM SECONDARY BATTERIES

(71) Applicant: LG Chem, Ltd., Seoul (KR)

(72) Inventors: Won Jung Kim, Daejeon (KR); Hoe Jin Hah, Daejeon (KR); Je Young Kim, Daejeon (KR)

(73) Assignee: LG Chem, Ltd. (KR)

(*) Notice: Subject to any disclaimer, the term of this patent is extended or adjusted under 35 U.S.C. 154(b) by 86 days.

(21) Appl. No.: 14/896,726

(22) PCT Filed: Jul. 31, 2014

(86) PCT No.: PCT/KR2014/007021
§ 371 (c)(1),
(2) Date: Dec. 8, 2015

(87) PCT Pub. No.: WO2015/016621
PCT Pub. Date: Feb. 5, 2015

(65) Prior Publication Data
US 2016/0133931 A1 May 12, 2016

(30) Foreign Application Priority Data
Jul. 31, 2013 (KR) .................. 10-2013-0090956

(51) Int. Cl.
| | |
|---|---|
| *H01M 4/58* | (2010.01) |
| *H01M 4/505* | (2010.01) |
| *H01M 4/525* | (2010.01) |
| *C01G 45/12* | (2006.01) |
| *C01G 51/00* | (2006.01) |
| *C01G 53/00* | (2006.01) |
| *H01M 10/0525* | (2010.01) |
| *H01M 10/052* | (2010.01) |

(52) U.S. Cl.
CPC ...... *H01M 4/5825* (2013.01); *C01G 45/1228* (2013.01); *C01G 45/1257* (2013.01); *C01G 51/50* (2013.01); *C01G 53/50* (2013.01); *H01M 4/505* (2013.01); *H01M 4/525* (2013.01); *H01M 4/582* (2013.01); *H01M 10/0525* (2013.01); *C01P 2002/50* (2013.01); *C01P 2002/52* (2013.01); *H01M 10/052* (2013.01); *H01M 2220/20* (2013.01); *H01M 2220/30* (2013.01); *Y02E 60/122* (2013.01); *Y02P 70/54* (2015.11)

(58) Field of Classification Search
CPC .................................. H01M 4/5825
See application file for complete search history.

(56) References Cited

U.S. PATENT DOCUMENTS

| | | | |
|---|---|---|---|
| 2005/0153206 A1 | 7/2005 | Oesten et al. | |
| 2006/0228631 A1* | 10/2006 | Miura | H01M 4/131 429/232 |
| 2008/0157027 A1* | 7/2008 | Manthiram | H01M 4/131 252/506 |
| 2009/0081529 A1 | 3/2009 | Thackeray et al. | |
| 2010/0086854 A1 | 4/2010 | Kumar et al. | |
| 2011/0076564 A1 | 3/2011 | Yu et al. | |
| 2011/0311869 A1* | 12/2011 | Oh | H01M 4/131 429/211 |
| 2012/0244432 A1 | 9/2012 | Park et al. | |

FOREIGN PATENT DOCUMENTS

| | | |
|---|---|---|
| CN | 102034976 A | 4/2011 |
| CN | 103181005 A | 6/2013 |
| JP | 2003297360 | 10/2003 |
| JP | 2010092848 | 4/2010 |
| JP | 2011096626 A | 5/2011 |
| JP | 2011134670 A | 7/2011 |
| JP | 2011181235 A | 9/2011 |
| JP | 2012504316 | 2/2012 |
| JP | 2012195082 A | 10/2012 |
| JP | 2012234772 A | 11/2012 |
| KR | 20050093535 A | 9/2005 |
| KR | 20100109605 A | 10/2010 |
| KR | 20120095803 A | 8/2012 |

OTHER PUBLICATIONS

International Search Report for Application No. PCTKR2014/007021 dated Nov. 6, 2014.
Chinese Search Report for Application No. 2014800324403 dated Dec. 12, 2016.

* cited by examiner

*Primary Examiner* — Peter F Godenschwager
(74) *Attorney, Agent, or Firm* — Lerner, David, Littenburg, Krumholz & Mentlik, LLP

(57) ABSTRACT

Disclosed is a method of preparing a positive electrode active material for lithium secondary batteries, the method including pre-activating at least one lithium transition metal oxide selected from compounds represented by Formula (1) below and modifying a surface of the pre-activated lithium transition metal oxide:

$$(1-x)LiM'O_{2-y}A_y - xLi_2MnO_{3-y'}A_{y'} \qquad (1),$$

wherein M' is $Mn_aM_b$; M is at least one selected from the group consisting of Ni, Ti, Co, Al, Cu, Fe, Mg, B, Cr, Zr, Zn and Period II transition metals; A is at least one selected from the group consisting of anions such as $PO_4$, $BO_3$, $CO_3$, F and $NO_3$; $0<x<1$; $0<y\leq 0.02$; $0<y'\leq 0.02$; $0.5\leq a\leq 1.0$; $0\leq b\leq 0.5$; and $a+b=1$.

8 Claims, No Drawings

METHOD OF PREPARING POSITIVE ELECTRODE ACTIVE MATERIAL FOR LITHIUM SECONDARY BATTERIES

CROSS-REFERENCE TO RELATED APPLICATION

This application is a national phase entry under 35 U.S.C. § 371 of International Application No. PCT/KR2014/007021, filed Jul. 31, 2014, which claims priority to Korean Patent Application No. 10-2013-0090956, filed Jul. 31, 2013, the disclosures of which are incorporated herein by reference.

TECHNICAL FIELD

The present invention relates to a method of preparing a positive electrode active material for lithium secondary batteries.

BACKGROUND ART

As mobile device technology continues to develop and demand therefor continues to increase, demand for secondary batteries as energy sources is rapidly increasing. Among these secondary batteries, lithium secondary batteries, which exhibit high energy density and operating potential, and have long cycle lifespan and a low self-discharge rate, are commercially available and widely used.

In addition, as interest in environmental problems is increasing, research into electric vehicles (EVs), hybrid electric vehicles (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel-metal hydride (Ni-MH) secondary battery is mainly used. However, research into lithium secondary batteries having high energy density, high discharge voltage, and high output stability is actively carried out and some of the lithium secondary batteries are commercially available.

A lithium secondary battery has a structure in which an electrode assembly, which includes a positive electrode prepared by coating a positive electrode active material on a positive electrode current collector, an negative electrode prepared by coating an negative electrode active material on an negative electrode current collector, and a porous separator disposed between the positive electrode and the negative electrode, is impregnated with a lithium salt-containing non-aqueous electrolyte.

As positive electrode active materials for such lithium secondary batteries, lithium-containing cobalt oxides such as $LiCoO_2$ are mainly used. In addition thereto, use of lithium-containing manganese oxides such as $LiMnO_2$ having a layered crystal structure, $LiMn_2O_4$ having a spinel crystal structure and the like, and lithium-containing nickel oxides such as $LiNiO_2$ is also under consideration.

$LiCoO_2$ is widely used due to excellent overall physical properties such as excellent cycle properties, and the like, but is low in safety. In addition, due to resource limitations of cobalt as a raw material, $LiCoO_2$ is expensive and mass use thereof as power sources in fields such as electric vehicles and the like is thus limited. Due to characteristics of preparation methods of $LiNiO_2$, it is difficult to mass-produce $LiNiO_2$ at reasonable expense.

On the other hand, lithium manganese oxides, such as $LiMnO_2$, $LiMn_2O_4$, and the like, are advantageous in that they contain Mn, which is an abundant and environmentally friendly raw material, and thus are drawing much attention as a positive electrode active material that can replace $LiCoO_2$. However, such lithium manganese oxides also have disadvantages such as poor cycle characteristics and the like.

First, $LiMnO_2$ has disadvantages such as a low initial capacity and the like. In particular, $LiMnO_2$ requires dozens of charge and discharge cycles until a constant capacity is reached. In addition, capacity reduction of $LiMn_2O_4$ becomes serious with increasing number of cycles, and, at particularly high temperature of 50° C. or more, cycle characteristics are rapidly deteriorated due to decomposition of an electrolyte solution, elution of manganese and the like.

Meanwhile, as lithium-containing manganese oxides, there is $Li_2MnO_3$ in addition to $LiMnO_2$ and $LiMn_2O_4$. Since structural stability of $Li_2MnO_3$ is excellent but it is electrochemically inactive, $Li_2MnO_3$ itself cannot be used as a positive electrode active material of secondary batteries. Therefore, some prior technologies suggest technology of using a solid solution of $Li_2MnO_3$ and $LiMO_2$ (M=Co, Ni, $Ni_{0.5}Mn_{0.5}$, Mn) as a positive electrode active material. In such a positive electrode active material solid solution, Li and O are separated from a crystal structure at a high voltage of 4.4 V and, thus, electrochemical activity is exhibited. However, there are problems such as high possibility of electrolyte solution decomposition and gas generation at high voltage, and mass use of relatively expensive materials such as $LiMO_2$ (M=Co, Ni, $Ni_{0.5}Mn_{0.5}$, Mn) and the like.

In addition, lithium-containing manganese oxides have low conductivity, and thus, have large difference in resistance, depending upon particle sizes. In addition, when activation thereof is performed at a high voltage of 4.4 V or more in order to exhibit high capacity, $Li_2O$ is separated from $Li_2MnO_3$, and thus, structural change may occur. Furthermore, due to structural characteristics of lithium-containing manganese oxide crystals, it is difficult to guarantee desired stability and it is limited to anticipate improved energy density.

In addition, carbon based materials are mainly used as negative electrodes for lithium secondary batteries. However, the carbon based materials have a low electric potential of 0 V with respect to lithium, and thus, cause reduction of an electrolyte, thereby generating gas. To address this problem, metal oxides having a relatively high electric potential are used as a negative electrode active material.

However, in this case, a large amount of gas is generated during activation and charge-discharge processes, and thus, side reaction of an electrolyte is facilitated, thereby decreasing secondary battery safety.

Therefore, there is a need to develop a technology that can resolve the above-described problems.

DISCLOSURE

Technical Problem

Therefore, the present invention has been made to solve the above and other technical problems that have yet to be resolved.

The present invention aims to provide a method of manufacturing a lithium secondary battery that may suppress additional side reaction by including a pre-activation process, wherein a process, in which oxygen atoms of metal oxide are reduced to an active gas state, is carried out in a raw material state, in order to adjust charge valence according to an increased oxidation number of a metal during charging in which lithium is eliminated from a positive electrode active material, and thus, may enhance battery performance.

Technical Solution

In accordance with one aspect of the present invention, provided is a method of preparing a positive electrode active material for lithium secondary batteries, the method including pre-activating at least one lithium transition metal oxide selected from compounds represented by Formula (1) below; and modifying a surface of the pre-activated lithium transition metal oxide:

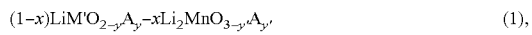

(1), wherein M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$, and;

$0<x<1$; $0<y\le0.02$; $0<y'\le0.02$; $0.5\le a\le1.0$; $0\le b\le0.5$; and $a+=1$.

The pre-activating may include a chemical delithiation process.

In the chemical delithiation process, reaction with a lithium adsorbent including $BF_4$ salt and/or ammonium salt may be carried out. The pre-activating may include a high-temperature delithiation process.

The high-temperature delithiation process may include heat-treating the lithium transition metal oxide at 250° C. or more.

The high-temperature delithiation process may include heat-treating the lithium transition metal oxide at 300° C. or more.

The high-temperature delithiation process may include heat-treating the lithium transition metal oxide at 400° C. or more.

The modifying is carried out according to at least one method selected from the group consisting of an atomic layer deposition (ALD) method, a mechanical milling method, a wet method, a chemical vapor deposition (CVD) method, and a plasma chemical vapor deposition (PCVD) method.

In addition, the present invention may provide a positive electrode active material prepared by the method.

In addition, the present invention may provide a battery including the positive electrode active material.

The batteries are generally composed of a positive electrode, a negative electrode, a separator disposed between the positive electrode and the negative electrode, and a lithium salt-containing non-aqueous electrolyte. Other components of the lithium secondary batteries are described below.

Generally, the positive electrode is prepared by coating a mixture including a positive electrode active material, a conductive material and a binder, as an electrode mixture, on a positive electrode current collector and then drying the same, and, as needed, the mixture may further include a filler.

Examples of the positive electrode active material include, other than the electrode active material represented by Formula 1, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ where $0\le x\le0.33$, $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having Formula $LiNi_{1-x}M_xO_2$ where M=Co, Mn, Al, Cu, Fe, Mg, B, or Ga, and $0.01\le x\le0.3$; lithium manganese composite oxides having Formula $LiMn_{2-x}M_xO_2$ where M=Co, Ni, Fe, Cr, Zn, or Ta, and $0.01\le x\le0.1$ or Formula $Li_2Mn_3MO_8$ where M=Fe, Co, Ni, Cu, or Zn; spinel-structure lithium manganese composite oxides represented by $LiNi_xMn_{2-x}O_4$; $LiMn_2O_4$ where some Li atoms are substituted with alkaline earth metal ions; disulfide compounds; and $Fe_2(MoO_4)_3$, but the present invention is not limited thereto.

The positive electrode current collector is generally fabricated to a thickness of 3 to 500 μm. The positive electrode current collector is not particularly limited so long as it does not cause chemical changes in the fabricated secondary battery and has high conductivity. For example, the positive electrode current collector may be made of stainless steel, aluminum, nickel, titanium, sintered carbon, or aluminum or stainless steel surface-treated with carbon, nickel, titanium, silver, or the like. The positive electrode current collector may have fine irregularities at a surface thereof to increase adhesion between a positive electrode active material and the positive electrode current collector. In addition, the positive electrode current collector may be used in any of various forms including films, sheets, foils, nets, porous structures, foams, and non-woven fabrics.

The conductive material is typically added in an amount of 1 to 50 wt % with respect to the total weight of the mixture including the positive electrode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

Meanwhile, the graphite based materials having elasticity may be used as a conductive material, and the materials listed above may be used with the graphite based materials.

The binder is a component assisting in binding between the active material and the conductive material and in binding of the electrode active material to the current collector. The binder is typically added in an amount of 1 to 50 wt % with respect to the total weight of the mixture including the positive electrode active material. Examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The filler is optionally used as a component to inhibit positive electrode expansion. The filler is not particularly limited so long as it is a fibrous material that does not cause chemical changes in the fabricated battery. Examples of the filler include olefin based polymers such as polyethylene and polypropylene; and fibrous materials such as glass fiber and carbon fiber.

The negative electrode is manufactured by coating, drying and pressing a negative electrode active material on the negative electrode current collector, and, as needed, the conductive material, the binder, the filler, etc. may be selectively, further included.

The negative electrode active material may further include, for example, carbon such as hard carbon, graphite based carbon; metal composite oxides such as $Li_xFe_2O_3$ ($0 \leq x \leq 1$, $Li_xWO_2$ where $0 \leq x \leq 1$, $Sn_xMe_{1-x}Me'_yO_z$ where Me: Mn, Fe, Pb or Ge; Me': Al, B, P, Si, Group I, Group II and Group III elements, or halogens; $0 < x \leq 1$; $1 \leq y \leq 3$; and $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials; titanium oxides; lithium titanium oxides; and the like, particularly carbon based materials and/or Si.

The negative electrode current collector is typically fabricated to a thickness of 3 to 500 μm. The negative electrode current collector is not particularly limited so long as it does not cause chemical changes in the fabricated secondary battery and has conductivity. For example, the negative electrode current collector may be made of copper, stainless steel, aluminum, nickel, titanium, sintered carbon, copper or stainless steel surface-treated with carbon, nickel, titanium, or silver, and aluminum-cadmium alloys. Similar to the positive electrode current collector, the negative electrode current collector may also have fine irregularities at a surface thereof to enhance adhesion between the negative electrode current collector and a negative electrode active material. In addition, the negative electrode current collector may be used in various forms including films, sheets, foils, nets, porous structures, foams, and non-woven fabrics.

The separator is disposed between the positive electrode and the negative electrode. As the separator, an insulating thin film having high ion permeability and mechanical strength is used. A pore diameter of the separator is typically 0.01 to 10 μm and a thickness thereof is typically 5 to 300 μm. Examples of such a separator include sheets or non-woven fabrics made of an olefin polymer such as polypropylene, glass fibers, or polyethylene, which have chemical resistance and hydrophobicity, Kraft paper, etc. When, as an electrolyte, a solid electrolyte is used, the solid electrolyte also functions as a separator.

The lithium salt-containing non-aqueous electrolyte is composed of a non-aqueous electrolyte and lithium, and examples of the non-aqueous electrolyte include non-aqueous organic solvents, organic solid electrolytes, inorganic solid electrolytes, etc., but the present invention is not limited thereto.

Examples of the non-aqueous organic solvent include aprotic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

A lithium salt is a material that is readily soluble in the non-aqueous electrolyte and examples thereof include, but are not limited to, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, and aluminum trichloride may be added to the lithium salt-containing non-aqueous electrolyte. If necessary, in order to impart incombustibility, the electrolyte may further include halogen-containing solvents such as carbon tetrachloride and ethylene trifluoride. Further, in order to enhance high-temperature storage characteristics, the electrolyte may further include carbon dioxide gas, fluoro-ethylene carbonate (FEC), propene sultone (PRS), fluoro-propylene carbonate (FPC), etc.

In a specific embodiment, a lithium salt-containing non-aqueous electrolyte may be prepared by adding a lithium salt such as $LiPF_6$, $LiClO_4$, $LiBF_4$, or $LiN(SO_2CF_3)_2$ to a mixed solvent including EC or PC, which is a high dielectric solvent and a cyclic carbonate, and DEC, DMC, or EMC, which is a low viscosity solvent and a linear carbonate.

The present invention provides a battery module including the secondary battery as a unit cell, a battery pack including the battery module, and a device including the battery pack as a power source.

Here, specific examples of the device include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power Mode for Invention Now, the present invention will be described in more detail with reference to the accompanying drawings. These examples are provided for illustrative purposes only and should not be construed as limiting the scope and spirit of the present invention.

EXAMPLE 1

Preparation of Positive Electrode $Li(L_{i1.2}Co_{0.1}Ni_{0.6}Mn_{0.6})O_2$ was used as a positive electrode active material, and a 100 ml solution including $BF_4$ 2.0 g dissolved therein was added to the positive electrode active material and mixed. The mixed solution was heat-treated at 250° C. and then delithiated by washing with water and vacuum drying. Subsequently, a surface modification process was carried out using mechanical milling, thereby preparing a positive electrode active material.

The prepared positive electrode active material, carbon black as a conductive material, and PVdF as a binder were added to n-methyl-2-pyrrolidone (NMP) in a weight ratio of 90:5:5, and mixed, thereby preparing a positive electrode mixture. The prepared positive electrode mixture was coated to a thickness of 40 μm on aluminum foil having a thickness of 20 μm as a positive electrode current collector, followed by pressing and drying. As a result, a positive electrode was prepared.

Preparation of Negative Electrode

Natural graphite as a negative electrode, carbon black as a conductive material and PVdF as a binder were added to n-methyl-2-pyrrolidone (NMP) in a weight ratio of 90:5:5 and mixed, thereby preparing a negative electrode mixture.

10 μm copper foil was used, and the prepared negative electrode mixture was coated to a thickness of 40 μm on the negative electrode current collector. Subsequently, pressing and drying were carried out, thereby preparing a negative electrode.

Manufacture of Secondary Battery

An electrode assembly was manufactured by disposing a separator (Toray, thickness: 15 μm) between the negative electrode and the positive electrode. Subsequently, the electrode assembly was accommodated in a pouch-type battery case, and a lithium non-aqueous electrolyte solution including a mixture of ethyl carbonate:dimethyl carbonate:ethylmethyl carbonate mixed in a volume ratio of 1:1:1 and 1 M $LiPF_6$ as a lithium salt was added thereto, thereby manufacturing a lithium secondary battery.

EXAMPLE 2

A lithium secondary battery was manufactured in the same manner as in Example 1, except that, in the delithiation process of the positive electrode active material, heat-treatment was carried out at 300° C.

EXAMPLE 3

A lithium secondary battery was manufactured in the same manner as in Example 1, except that, in the delithiation process of the positive electrode active material, heat-treatment was carried out at 400° C.

COMPARATIVE EXAMPLE 1

A lithium secondary battery was manufactured in the same manner as in Example 1, except that, in the process of preparing the positive electrode active material, the delithiation process and the surface modification process were not carried out.

COMPARATIVE EXAMPLE 2

A lithium secondary battery was manufactured in the same manner as in Example 1, except that, in the process of preparing the positive electrode active material, delithiation process was not carried out.

COMPARATIVE EXAMPLE 3

A lithium secondary battery was manufactured in the same manner as in Example 1, except that, in the process of preparing the positive electrode active material, the surface modification process was not carried out.

EXPERIMENTAL EXAMPLE 1

The secondary batteries according to Examples 1 to 3 and Comparative Examples 1 to 3 were charged up to 3.35 V at 0.1 C and 5 mA, and stored for two days at room temperature and for one day at 60° C. Subsequently, a side-reaction gas removal process was carried out for 30 seconds to one minute at 93 kPa, and then charging was carried out up to 4.3 V at 0.5 C. Subsequently, constant-voltage charging was carried out up to 0.05 C and discharging was carried out up to 2.5 V at 0.5 C. 250 cycles of such charging and discharging were carried out at 45° C. and then gas generation amounts were measured. Results are summarized in Table 1 below.

TABLE 1

|  | Gas generation amounts (μl) |
| --- | --- |
| Example 1 | 10471 |
| Example 2 | 10415 |
| Example 3 | 10350 |
| Comparative Example 1 | 12850 |
| Comparative Example 2 | 12650 |
| Comparative Example 3 | 11030 |

As shown in Table 1, it can be confirmed that gas generation amounts in the secondary batteries of Examples 1 to 3 according to the present invention are lower, when compared with the battery of Comparative Example 1. Accordingly, it can be confirmed that, by including the delithiation process and the surface modification process in the process of preparing the positive electrode active material, gas generation amounts within the batteries are decreased and battery safety is dramatically enhanced

EXPERIMENTAL EXAMPLE 2

A theoretical capacity of 15 mAh/ea of the secondary batteries according to Example 1 and Comparative Example 1 was calculated to 0.5 C, and a 0.5 C capacity was measured through charge and discharge in which a current of 17.8 mA was applied to the batteries. In addition, a 3 C capacity through charge and discharge in which a current of 100 mAh corresponding to 2 C was applied to the batteries was measured, and a rate characteristic was expressed in 2 C/1 C capacity. Results are summarized in Table 2 below.

TABLE 2

|  | Battery characteristics | |
| --- | --- | --- |
|  | 0.5 C capacity (mAh) | 2 C/1 C rate |
| Example 1 | 26 | 96.0% |
| Comparative Example 1 | 30 | 95.4% |

As shown in Table 2, it can be confirmed that the secondary battery of Example 1 according to the present invention exhibits partial capacity reduction due to the delithiation process and the surface modification process, but an enhanced rate characteristic, when compared with the secondary battery of Comparative Example 1. Accordingly, it can be confirmed that, by including the delithiation process and the surface modification process in the process of preparing the positive electrode active material among battery manufacturing processes, electrochemical performance of the secondary batteries was enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, a method of preparing a positive electrode active material according to the present invention may provide a lithium secondary battery that suppresses additional side reaction by including a process of pre-activating a transition metal oxide and exhibits enhanced battery performance.

The invention claimed is:

1. A method of preparing a positive electrode active material for lithium secondary batteries, the method comprising;

pre-activating at least one lithium transition metal oxide selected from compounds represented by Formula (1) below; by adding and mixing a solution including $BF_4$ dissolved therein to the lithium transition metal oxide, followed by heat-treating the lithium transition metal oxide; and, modifying a surface of the pre-activated lithium transition metal oxide using a mechanical milling method:

$$(1-x)LiM'O_2-xLi_2MnO_3 \qquad (1),$$

wherein M' is $Mn_aM_b$;

M is at least one metal selected from Ni, Ti, Co, Al, Cu, Fe, Mg, B, Cr, Zr, and Zn; and $0<x<1$; $0.5 \leq a \leq 1.0$; $0 \leq b \leq 0.5$; and $a+b=1$.

2. The method according to claim 1, wherein the heat-treating is carried out at 250° C. or more.

3. The method according to claim 2, wherein the heat-treating is carried out at 300° C. or more.

4. The method according to claim 3, wherein the heat-treating is carried out at 400° C. or more.

5. A positive electrode active material prepared by the method according to any one of claim 2, 3, or 4.

6. A battery comprising the positive electrode active material according to claim 5.

7. A battery pack comprising the battery according to claim 6.

8. A device using the battery pack according to claim 7 as a power source.

* * * * *